(12) United States Patent
Schmidt et al.

(10) Patent No.: US 7,183,689 B2
(45) Date of Patent: Feb. 27, 2007

(54) TORQUE MOTOR HAVING A SEGMENT DESIGN

(75) Inventors: Dirk Schmidt, Suhl (DE); Vladimir Zharski, Minsk (BY)

(73) Assignee: INA Drives & Mechatronics GmbH & Co. oHG, Suhl (DE)

( * ) Notice: Subject to any disclaimer, the term of this patent is extended or adjusted under 35 U.S.C. 154(b) by 0 days.

(21) Appl. No.: 10/506,931

(22) PCT Filed: Feb. 28, 2003

(86) PCT No.: PCT/EP03/02125

§ 371 (c)(1),
(2), (4) Date: Sep. 8, 2004

(87) PCT Pub. No.: WO03/077404

PCT Pub. Date: Sep. 18, 2003

(65) Prior Publication Data

US 2005/0082938 A1    Apr. 21, 2005

(30) Foreign Application Priority Data

Mar. 8, 2002 (DE) .............................. 102 10 071

(51) Int. Cl.
*H02K 1/12* (2006.01)
(52) U.S. Cl. ......................................... 310/258; 310/89
(58) Field of Classification Search .................. 310/89, 310/91, 254, 258–259, 261, 216, 217–218
See application file for complete search history.

(56) References Cited

U.S. PATENT DOCUMENTS

| | | | |
|---|---|---|---|
| 4,315,171 A | 2/1982 | Schaeffer | |
| 5,592,731 A | 1/1997 | Huang et al. | |
| 6,321,439 B1 | 11/2001 | Berrong et al. | |
| 6,429,554 B1 * | 8/2002 | Albrich et al. | 310/254 |
| 6,492,756 B1 * | 12/2002 | Maslov et al. | 310/156.12 |
| 6,603,237 B1 * | 8/2003 | Caamano | 310/254 |
| 6,781,276 B1 * | 8/2004 | Stiesdal et al. | 310/254 |

* cited by examiner

*Primary Examiner*—Thanh Lam
(74) *Attorney, Agent, or Firm*—Klaus P. Stoffel; Wolff & Samson PC

(57) ABSTRACT

A torque motor having an annular rotor and an annular stator. The stator includes a stator frame with iron cores and electrical windings arranged thereon. The iron cores and the electrical windings are arranged in at least one independent stator segment so that each stator segment is independently operable. Each stator segment has its own housing, in which the segment's iron core and the segment's electrical winding are installed. Each stator segment is configured to occupy a predetermined angular segment $\leq 180°$ in the stator frame. Each stator segment is detachably joined to the stator frame so that the segment can be installed and removed independently of other stator segments without damaging its electrical winding or the stator frame.

14 Claims, 5 Drawing Sheets

TORQUE MOTOR HAVING A SEGMENT DESIGN

PRIORITY CLAIM

This is a U.S. national stage of application No. PCT/EP03/02125, filed on Feb. 28, 2003. Priority is claimed on that application and on the following application: Country: Germany, Application No.: 102 100 71.3, Filed: Mar. 8, 2001.

BACKGROUND OF THE INVENTION

The present invention concerns a torque motor with an annular rotor and an annular stator, which comprises a stator frame with iron cores and electrical windings arranged thereon.

Besides conventional rotary motors, which have drive functions involving the use of intermediate drive elements, so-called direct drives, in which the drive forces that are produced are delivered to the driven parts without intermediate drive elements, are being used to an increasing extent in a wide variety of technical areas. So-called torque motors of the type specified above are also counted among these direct drives.

The company publication "Direct Drives & Systems" by the company ETEL S.A., Switzerland, version 1.1 (Jul. 1, 1999.), describes a torque motor that has a stationary stator frame and an annular rotor that runs inside the stator frame. The rotor consists of a rotor frame and permanent magnets mounted on it, which provide permanent excitation. The stator, which also has an annular design, has an iron core and an electrical winding arranged thereon. Cooling elements, which are connected to a water cooling system, are mounted on the outside of the stator ring. With a diameter of 2.5 m, this motor can produce torques of about 10,000 Nm. In addition to producing large forces, a torque motor of this type allows precise positioning, large accelerations, and speeds in a large range of variation. However, as with other electric motors, there is the problem that very large and heavy rotating parts must be manufactured, shipped and assembled, which has a significant impact on production costs. Since direct drives of this type are frequently used in expensive total installations, the reliability of the motor is another important criterion. One of the most important causes of failure is damage to the electrical winding of the motor, which can result, for example, in a short circuit between individual windings. In a case such as this, the entire motor must be disassembled to replace the electrical winding. The individual windings are usually enclosed in a casting compound that consists of synthetic resin, impregnating resin, or the like, so that only a total replacement of the entire electrical winding is possible. Due to the size of these direct drives, disassembly is expensive. Since the direct drive is an essential component of complex installations, the installation cannot be used during the entire repair time when such a failure occurs.

U.S. Pat. No. 4,315,171 describes a step motor, in which the stator is divided into individual segments. The objective to be achieved with this previously known motor is to use the material required for the production of the stacks of iron plates more effectively by segmentation of the stator in order to lower production costs without adversely affecting the output capacity of the motor. To achieve this objective, the circular stator is divided into several segments, whose iron cores then comprise only circular segments, whereby the production-related material waste is reduced. Individual segments are then combined into a stator, and all segments are installed in a single common housing. The electrical windings must be secured in the housing for permanent operability of the motor, which is usually accomplished by casting the coils in the housing.

SUMMARY OF THE INVENTION

The objective of the present invention is thus to make available a torque motor which allows replacement of individual segments of the electrical winding without assembly-related damage of the electrical winding and without disassembly of the whole stator and which, at the same time, can be adapted to changed power requirements, even after its original manufacture, i.e., under variable conditions of use.

An important advantage of this torque motor of the invention is that the individual stator segments have significantly smaller dimensions than the stator assembled from the segments. The individual segments can be readily manufactured with the use of standard machine tools. Shipment of the motor broken down in segments also presents no problems. The stator of the torque motor can be assembled directly at its site of use by installing the stator segments in the desired place in the stator frame. Another advantage of the torque motor is that, in the case of a defect in the electrical winding, only the stator segment with the defective section of the winding must be removed. The rest of the motor remains in perfectly good condition and completely serviceable. If care is taken during the construction of installations to ensure that the stator segments remain readily accessible, defective segments can be removed without having to remove the whole motor from the installation. Furthermore, repairs of the motor can be made very quickly by merely placing a new stator segment in the position of a defective segment.

Finally, the torque motor of the invention has the advantage that similar stator segments can be used to build different motors, whose output depends on the number of stator segments used. Different numbers of segments can be used in the stator without disturbing the operability of the motor. To produce the maximum capacity, the stator frame is equipped with stator segments along its entire circumference. If smaller powers are adequate, gaps can be left between individual stator segments, naturally, giving due consideration to the required pole count for trouble-free operation of the motor.

In general, the torque motor is still operable if only a single stator segment is installed, which then occupies a small section of, for example, 10° to 30° in the stator frame. This design can be used especially if only low speeds of revolution and low torques are needed, but, on the other hand, high precision is desirable.

In an advantageous embodiment of the torque motor, the annular rotor comprises a rotor frame and permanent magnets mounted on it. In this way, a permanent excitation field is provided, so that power supply to excitation windings of the rotor is unnecessary. Due to this elimination of electric sliding contacts, the torque motor requires only a small amount of maintenance.

In accordance with a modified embodiment, the electrical windings of several stator segments are electrically connected by electrical connecting elements, which run between the stator segments and are detachable. The type of electrical connection of the individual windings depends on the selected mode of operation. For example, several windings can be connected in parallel to form units, which in turn can be electrically connected in series. The connecting elements can be realized, for example, by plug connections or screw connections. This allows quick disassembly of individual stator segments.

An especially advantageous embodiment is characterized by the fact that the stator frame comprises a lower and an upper stator ring, between which the stator segments are positioned. It is especially advantageous if several frame webs, on which the stator segments are mounted, run vertically between the lower stator ring and the upper stator ring. In addition, the frame webs define the distance between the lower stator ring and the upper stator ring, so that, if necessary, it is also possible to remove all of the stator segments, for example, to perform maintenance work. In general, however, it is also possible to use only an upper or a lower stator ring, since the stator segments are designed to be self-supporting and can thus partially take on the function of the frame. If a closed stator is formed by adjacent stator segments, it would be possible, if necessary, to dispense entirely with the lower and upper stator rings.

To provide a simple means of achieving circular alignment of the stator segments, it is advantageous if the frame webs have lateral faces that are angled relative to one another and thus lie on different radial planes. In this regard, it is also possible to use frame webs with different thicknesses, thereby making it possible to vary the exact position of the stator segments. This makes it possible, for example, to achieve optimum adjustment of the cogging forces that arise during motor operation.

In a preferred embodiment of the torque motor, three coils on iron cores are installed in each stator segment, which are each coupled with the associated coils of the adjacent stator segments. In this way, the torque motor is designed as a three-phase AC synchronous motor (three-phase alternating current motor). In general, the control methods and automatic control systems generally known for direct drives are used to control the torque motor.

To generate high field strengths by the electrical windings without causing damage of the individual coil wires or the respective insulation, it is useful if a heat sink with a flow channel for the passage of a cooling medium is mounted on each stator segment. In the simplest case, cooling can be effected by the airflow that develops. In the case of higher requirements, a liquid coolant is passed through sealed flow channels. In this case, the flow channels of adjacent stator segments are connected with one another in series by detachable channel connectors to continue to allow the quick disassembly of individual stator segments. When necessary, the channel connectors and the electrical connecting elements are detached to remove the stator segment. If the operation of the motor is to be continued without this stator segment, bridging elements are used to allow electrical coupling and continued passage of the coolant between the adjacent stator segments, which are now separated by a gap.

Specific embodiments of the torque motor also have temperature sensors in each stator segment and an integrated measuring system, with which the relative and/or absolute position of the rotor and stator can be determined. The measured values that are obtained are analyzed by the motor-speed control, for which conventional methods can be used.

Further advantages, details, and refinements are described below with reference to the preferred embodiments of the invention that are illustrated in the drawings.

DETAILED DESCRIPTION OF THE INVENTION

Figure 1:
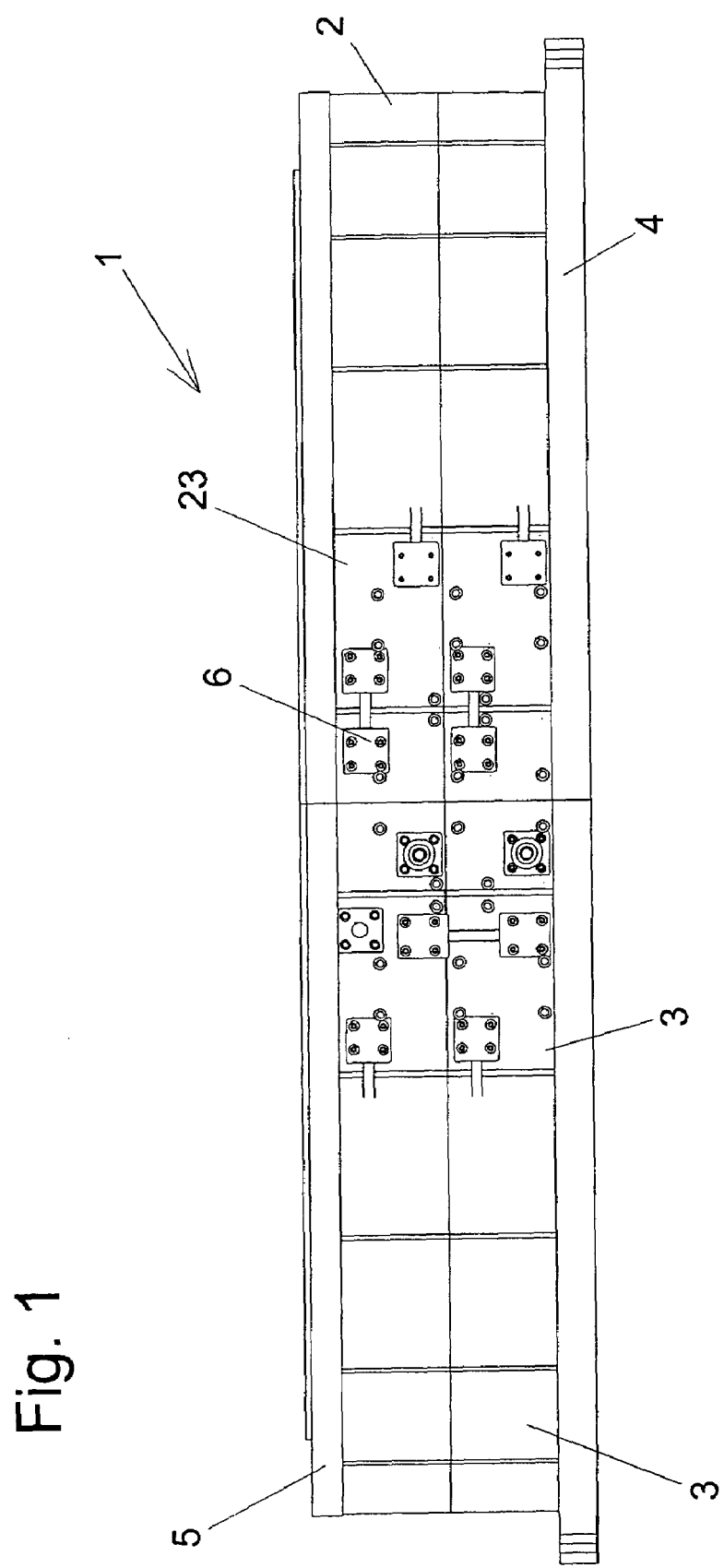
FIG. 1 shows a simplified side view of a torque motor of the invention.

FIG. 1 shows a side view of a torque motor 1 in accordance with the invention. The illustrated embodiment is a synchronous motor with an external annular stator 2. The stator 2 consists of several stator segments 3, of which only the middle three are shown in detail in the drawing for the sake of simplicity. In the illustrated embodiment, the stator segments 3 are arranged in a row and are installed on the entire circumference of the stator. In a modified embodiment, it would be possible, for example, to leave out every other stator segment or to use even fewer stator segments than that.

A lower stator ring 4, on which the individual stator segments are set, forms the lower termination of the stator. The stator segments are covered at their upper end by an upper stator ring 5. In the embodiment illustrated in FIG. 1, the stator rings 4, 5 are used for mounting the stator segments and for increasing the stability of the stator as a whole. In other embodiments, one or both stator rings can be dispensed with as long as the positioning and mounting of the stator segments are ensured by other means.

The individual stator segments 3 are connected to one another by electrical connecting elements 22 and by detachable channel connectors 6 whose function will be described further below.

Figure 2:
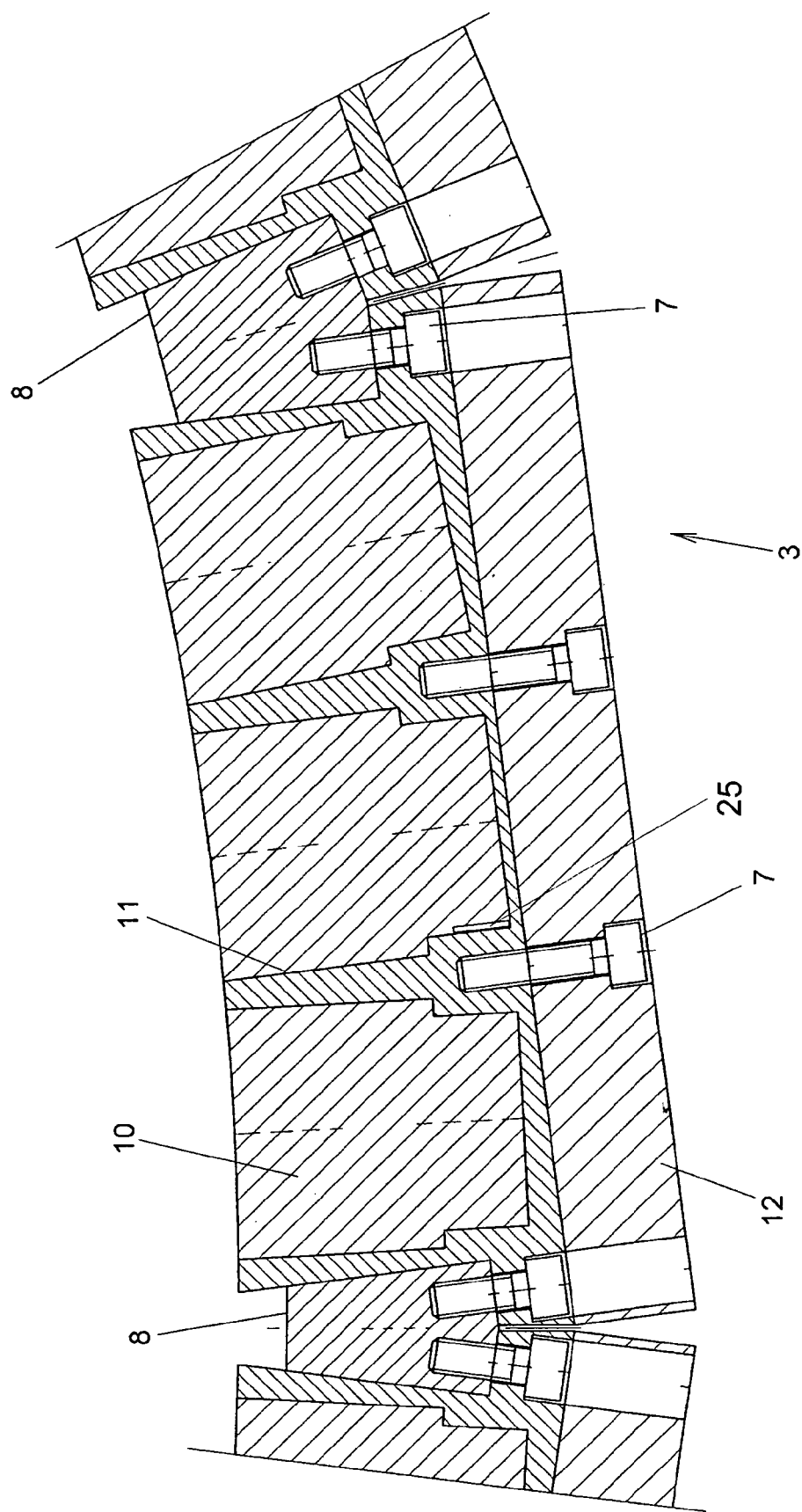
FIG. 2 shows a detail drawing of a stator segment in a sectional top view.

The detail drawing in FIG. 2 shows a sectional top view of an individual stator segment 3, which is mounted in the stator. In the illustrated embodiment, the stator segment 3 is mounted by threaded bolts 7 on two lateral frame webs 8, which extend vertically between the lower stator ring 4 and the upper stator ring 5. In modified embodiments, it would also be possible to mount the stator segments in the stator by, for example, clamping or locking connections.

FIG. 2 further shows that the frame webs 8 have lateral surfaces that lie on radial planes of the stator and run towards each other at an acute angle. This allows exact angular positioning of the stator segments to produce the circular cross section of the stator 2. It is also apparent that frame webs 8 of different thicknesses can be used to be able to vary the distance between adjacent stator segments 3. By suitable choice of the frame webs of the proper thickness, the stator segments can be mounted in the stator frame in the way that is desired to obtain the optimum position of the magnetic poles that form during operation.

Iron cores 10 and electrical windings 11 are located inside the stator segment 3. In the illustrated embodiment, three coils are formed in each stator segment by the electrical windings, so that the torque motor is driven by three current phases. The electrical windings 11 can be cast or encapsulated inside the stator segment 3 in the conventional way with synthetic resin compound, casting resin, or the like. The housing 23 of the stator segments 3 can be manufactured, for example, from aluminum.

In addition, a heat sink 12 is mounted on the outside of the stator segment 3 and serves to improve the dissipation of heat from the electrical windings 11. The heat sink 12 is mounted on the stator segment 3, for example, with threaded bolts 7. The channel connectors 6 shown in FIG. 1 serve to connect the respective flow channels of adjacent stator segments and must be temporarily removed during the removal of a stator segment.

To remove the stator segment shown in FIG. 2 from the stator frame, which can be necessary, for example, in the case of a defect in the electrical winding inside this stator segment, it is only necessary to unscrew the threaded bolts 7 that mount the stator segment 3 on the frame webs 8. The channel connectors 6 and the electrical connecting elements to the adjacent stator segments must also be removed. The stator segment can then be immediately removed from the motor to be replaced by a functioning stator segment.

Figure 3:
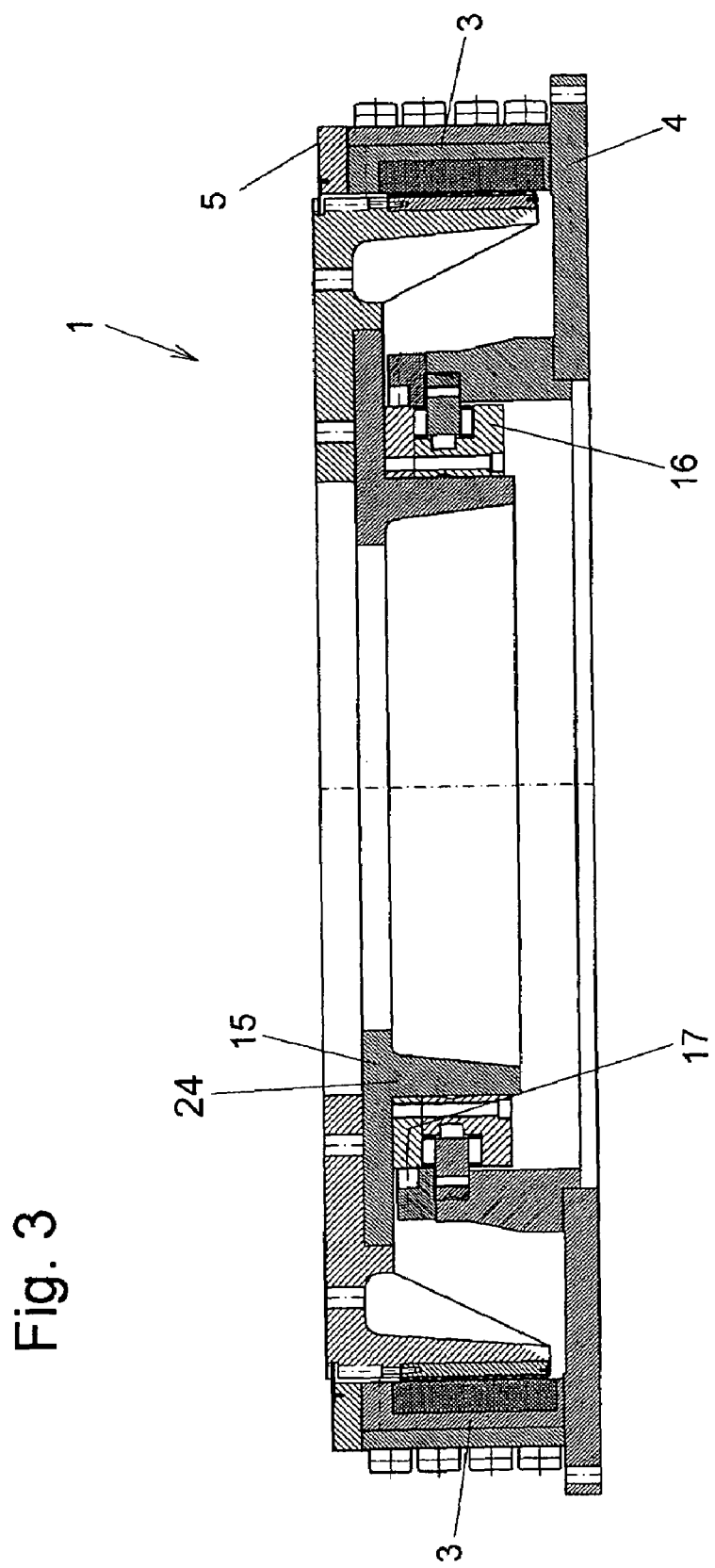
FIG. 3 shows a sectional side view of the torque motor.

FIG. 3 shows a sectional side view of the torque motor 1. Several stator segments 3 are installed in the external stator 2. In addition, the torque motor has an annular rotor 15 with a rotor frame 24, which can be conventionally designed as a permanently excited internal armature. In the illustrated example, the stator and rotor are coupled by a bearing 16, which is adapted to the specific purpose for which the motor is used. In addition, a measuring system 17 can be installed for providing position values. The lower and upper stator rings 4, 5 can comprise several annular segments if this facilitates the manufacture of large embodiments.

Figure 4:
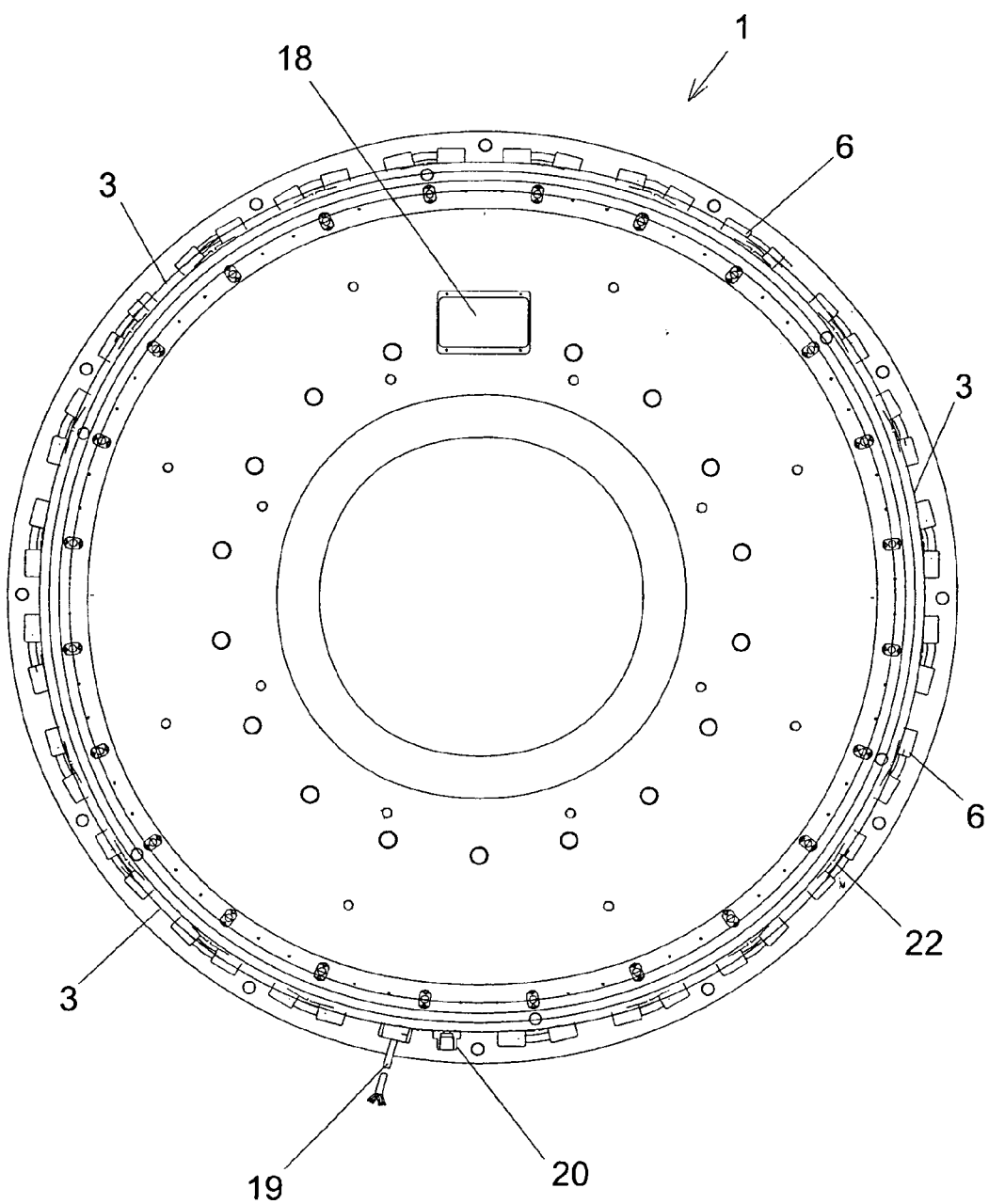
FIG. 4 shows a top view of the assembled torque motor.

FIG. 4 shows a top view of the assembled torque motor. Several detachable channel connectors 6 connect the cooling systems of the respective adjacent stator segments 3. A service opening 18 is provided in a motor cover for maintenance work that may become necessary. Power is supplied to the motor and measurement data from the measuring system is picked up through an electrical connector element 19. Data from temperature sensors 25, which are installed in each individual stator segment to monitor the operating temperature of the electrical winding, can also be read out at this location. The coolant passed through the heat sink 12 of the stator segments 3 is conducted through intake and discharge connectors 20.

Figure 5:
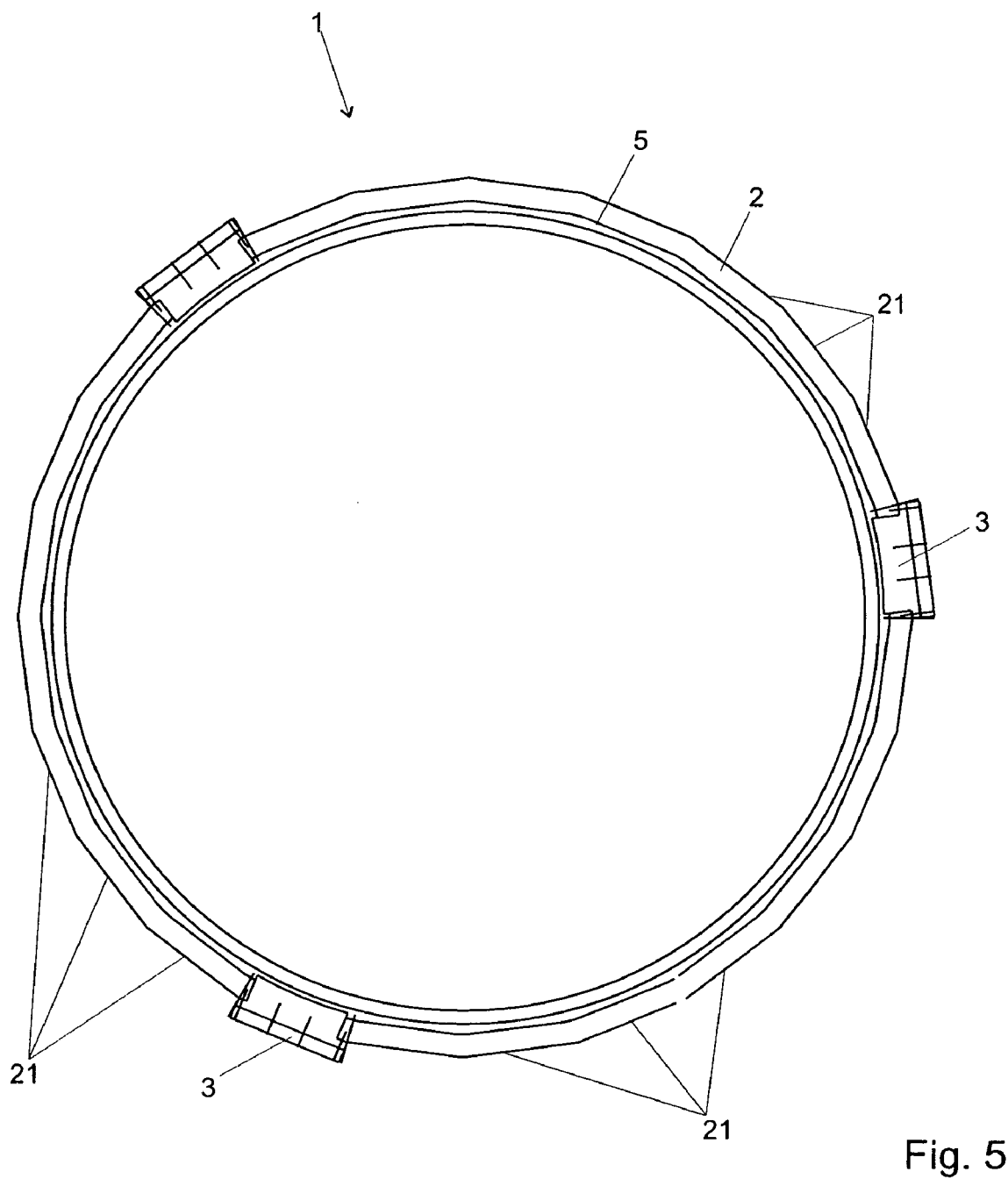
FIG. 5 shows a torque motor having angular segments without a stator segment.

FIG. 5 shows the torque motor 1 with angular segments 21 of the stator frame that are, by design, not occupied by any stator segments 3.

The torque motor of the invention can be constructed in different sizes and with different output values. The motor output can be readily adapted to the desired application by equipping the motor with any desired number of stator segments. If necessary in the case of increased power requirements, torque motors that have already been integrated in the installation can be provided with increased power output by installing additional stator segments, provided that suitable installation sites for additional stator segments were provided for in the original design. Other modifications are conceivable for adapting the design to any other desired applications.

The invention claimed is:

1. A torque motor, comprising: a rotor; and a stator, the stator including a stator frame with iron cores and electrical windings arranged thereon, the iron cores and the electrical windings are arranged in at least one independent stator segment so that each stator segment is independently operable, each stator segment having its own housing, in which the segment's iron core and the segment's electrical winding are installed, each stator segment being configured to occupy a predetermined angular segment ≦180° in the stator frame, whereby at least one angular segment in the stator frame is by design not occupied by any stator segment, each stator segment being detachably joined to the stator frame so that the segment can be installed and removed independently of other stator segments without damaging its electrical winding or the stator frame.

2. The torque motor in accordance with claim 1, where the stator includes a number of stator segments so that each stator segment occupies an angular segment ≦45° in the stator frame.

3. The torque motor in accordance with claim 1, wherein the rotor includes an annular rotor frame and permanent magnets mounted on the rotor frame.

4. The torque motor in accordance with claim 1, wherein the stator includes several stator segments, and further comprising electrical connecting elements that electrically connect the electrical windings of the several stator segments to one another, the electrical connecting elements being arranged to run between the stator segments and being detachably connected.

5. The torque motor in accordance with claim 1, wherein the stator frame includes a lower stator ring and an upper stator ring, between which the at least one stator segment is positioned.

6. The torque motor in accordance with claim 5, and further comprising several frame webs arranged to run between the lower stator ring and the upper stator ring essentially vertically to the stator rings, the stator segment being mounted to the webs.

7. The torque motor in accordance with claim 6, wherein lateral faces of the frame webs lie on different radial planes of the stator and are angled relative to one another.

8. The torque motor in accordance with claim 7, wherein the frame webs have different thicknesses between similar stator segments, so that a distance between adjacent stator segments is adjustable.

9. The torque motor in accordance with claim 1, wherein the motor is a three-phase AC synchronous motor, in which the electrical windings form three coils in each stator segment, which windings are coupled with associated coils of other stator segments.

10. The torque motor in accordance with claim 1, and further comprising a heat sink, which has at least one flow channel through which a coolant can flow, mounted on each stator segment.

11. The torque motor in accordance with claim 10, and further comprising detachable channel connectors arranged to connect the flow channels of adjacent stator segments with one another in series.

12. The torque motor in accordance with claim 1, and further comprising a temperature sensor installed in each stator segment to monitor temperature of the electrical winding in the respective stator segment.

13. The torque motor in accordance with claim 1, wherein the stator is configured to encompass the rotor as an outer ring, and further comprising a bearing installed between the stator and the rotor, and a measuring system integrated in the torque motor for determining relative position of the rotor and the stator.

14. The torque motor in accordance with claim 1, wherein the electrical winding of each segment is fastened to the stator segment by a resin compound or casting resin.

* * * * *